(12) United States Patent
Nam et al.

(10) Patent No.: US 8,727,675 B2
(45) Date of Patent: May 20, 2014

(54) DOUBLE-SIDED CUTTING INSERT

(75) Inventors: Ki Chan Nam, Chungcheongbuk-do (KR); Sang Yong Lee, Chungcheongbuk-do (KR); Wook Jung Sung, Chungcheongbuk-do (KR); Dong Bok Park, Chungcheongbuk-do (KR); Hak Kyu Kim, Chungcheongbuk-do (KR); Jong Chan Lee, Gyeongsangbuk-do (KR)

(73) Assignee: Korloy Inc., Seoul (KR)

( * ) Notice: Subject to any disclaimer, the term of this patent is extended or adjusted under 35 U.S.C. 154(b) by 54 days.

(21) Appl. No.: 13/333,617

(22) Filed: Dec. 21, 2011

(65) Prior Publication Data

US 2012/0170986 A1 Jul. 5, 2012

(30) Foreign Application Priority Data

Dec. 29, 2010 (KR) .......................... 10-2010-0137735

(51) Int. Cl.
*B23C 5/20* (2006.01)
(52) U.S. Cl.
USPC .......................... 407/113; 407/114; 407/103
(58) Field of Classification Search
USPC .................... 407/113, 114, 115, 16, 103, 116
See application file for complete search history.

(56) References Cited

U.S. PATENT DOCUMENTS

| | | | | |
|---|---|---|---|---|
| 4,984,943 A | * | 1/1991 | Hamilton | 408/144 |
| D324,690 S | * | 3/1992 | Takahashi et al. | D15/139 |
| 5,209,611 A | * | 5/1993 | Drescher | 407/48 |
| 5,704,737 A | * | 1/1998 | Alford | 407/114 |
| 6,648,560 B2 | * | 11/2003 | Andras | 407/109 |
| 7,520,700 B2 | * | 4/2009 | Johansson et al. | 407/114 |
| 7,905,688 B2 | * | 3/2011 | Ertl et al. | 407/42 |

FOREIGN PATENT DOCUMENTS

| | | |
|---|---|---|
| CN | 1482953 | 3/2004 |
| CN | 101745675 | 6/2010 |
| JP | 3065704 U | 2/2000 |
| JP | 2007-216385 | 8/2007 |
| KR | 10-2000-0067610 A | 11/2000 |

(Continued)

OTHER PUBLICATIONS

Notice of Allowance dated Jul. 29, 2013 for Korean Patent Application No. 10-2010-0137735, 2 pages.

(Continued)

*Primary Examiner* — Will Fridie, Jr.
(74) *Attorney, Agent, or Firm* — John D. Veldhuis-Kroeze; Westman, Champlin & Koehler, P.A.

(57) ABSTRACT

A double-sided cutting insert includes: rectangular shaped upper and lower surfaces formed at upper and lower sides of the insert; four side surfaces of each of the upper and lower surfaces; an assembling hole perpendicular to the upper surface; major cutting edges, at corners of one side surface, and rotationally symmetrical with respect to a center of an outer shape of the insert in a plan view where the upper surface is the front and rotationally symmetrical with respect to the center in a front view where the one of the side surfaces is the front; minor cutting edges, formed at one side of each major cutting edge, and rotationally symmetrical with respect to the center in the plan view; and minor side surfaces formed on a surface where the minor cutting edges meet the side surfaces and inclined toward the center with respect to an assembling hole central axis.

3 Claims, 9 Drawing Sheets

(56) References Cited

FOREIGN PATENT DOCUMENTS

| KR | 10-2001-0043370 A | 5/2001 |
| KR | 10-2004-0084657 A | 10/2004 |
| KR | 100718306 | 5/2007 |
| KR | 100718306 B1 | 5/2007 |
| KR | 1020100093236 | 8/2010 |

OTHER PUBLICATIONS

Office Action dated Jan. 6, 2014 for Chinese Patent Application No. 201110446306.6, 6 pages.

* cited by examiner

DOUBLE-SIDED CUTTING INSERT

CROSS-REFERENCE TO RELATED APPLICATIONS

This application claims the benefit of Korean Patent Application No. 10-2010-0137735, filed with the Korean Intellectual Property Office on Dec. 29, 2010, the disclosure of which is incorporated herein by reference in its entirety.

TECHNICAL FIELD

The present invention relates to a double-sided cutting insert for milling. More particularly, it relates to a double-sided cutting insert having a shape corresponding to a rectangular solid where major cutting edges and minor cutting edges are formed diagonally on an upper surface and a lower surface of the rectangular solid which are formed to be rotationally symmetrical to each other with respect to the center of the rectangular solid, the rectangular solid being symmetrical with respect to the center of an assembling hole so as to be usable in an inverted state or a rotated state.

BACKGROUND ART

In general, a cutting insert has a shape corresponding to a rectangular solid having six surfaces, including an upper surface, a lower surface, and four side surfaces, wherein the upper surface and the lower surface have an assembling hole formed through them and each of the upper surface and the lower surface has a major cutting edge and a minor cutting edge formed in the diagonal direction thereof.

The major cutting edge and the minor cutting edge are rotationally symmetrical to each other with respect to the center of the rectangular solid, i.e. the cutting insert, so as to allow the cutting insert to be also used in an inverted state or a rotated state.

Korean Patent No. 10-0718306 entitled "Cutting Insert" and filed by and issued to the applicant of the present invention discloses a conventional cutting insert.

The upper surface and the lower surface of the conventional cutting insert are symmetrical to each other to be rotated by 180 degrees with respect to an imaginary center by which a major side surface is divided into upper and lower sides. The upper surface and the lower surface includes first corner cutting edges higher than the upper surface and the lower surface and second corner cutting edges lower than the upper surface and the lower surface respectively at two corners thereof.

Inclined major cutting edges are formed between the first corner cutting edges and the second corner cutting edges respectively, and minor cutting edges are formed between the first corner cutting edges and the second corner cutting edges facing each other along minor side surfaces.

Meanwhile, each of the minor cutting edges includes a first inclined cutting edge, a second inclined cutting edge, a grooved minor cutting edge, and a flat cutting edge.

The cutting insert is mounted to a cutting tool, and a cutting performance of the cutting insert may be significantly varied depending on an inclination angle of a major cutting edge with respect to a direction where the cutting insert progresses when a work piece is cut.

An angle between a machined surface of a work piece and a major side surface is called a marginal angle, and frictional heat is generated between a cutting insert and the work piece depending on a magnitude of the marginal angle, greatly influencing a life span of the cutting insert.

A double-sided cutting insert employs major cutting edges on an upper and a lower surface thereof, in which case a posture of the cutting insert is determined when the cutting insert is mounted to a cutting tool so as to secure a marginal angle.

If the marginal angle is set and fixed according to the posture of the cutting insert, the above-described inclination angle is determined depending on an angle between the major cutting edge and a side surface of the cutting insert, in which case cutting performance is significantly varied depending on the inclination angle.

However, the conventional cutting insert secures only marginal angles of major cutting edges, but fails to secure any marginal angle on sides of minor cutting edges. In more detail, a side surface of the conventional cutting insert is perpendicular to a horizontal reference surface in a drawing where the side surface is the front.

Accordingly, although a marginal angle for reducing friction between the conventional cutting insert and a work piece may be secured in an angle between a side surface of the cutting insert and a surface of the work piece when the cutting insert is mounted to a tool, since a negative marginal surface is formed in terms of an angle between the major cutting edge and the work piece, it is necessary for the double-sided cutting insert to have a marginal angle for decreasing frictional heat and a marginal angle for improving cutting performance.

DISCLOSURE

Technical Problem

Accordingly, the present invention has been made to solve the above-mentioned problems occurring in the prior art, and the present invention provides a double-sided cutting insert which secures a marginal angle in an angle between a cut surface of a work piece and a minor side surface of the cutting insert during a cutting operation, preventing a life span of the cutting insert from being shortened due to generated heat, and secures an marginal inclination angle in an angle between the cut surface of the cutting insert and a major cutting edge, improving cutting performance.

The technical object of the present invention is not limited to the above-mentioned embodiment, and those skilled in the art can clearly appreciate other objects of the present invention from the following description.

Technical Solution

In accordance with an aspect of the present invention, there is provided a double-sided cutting insert including: an upper surface and a lower surface each having a rectangular shape and formed at upper and lower sides of the double-sided cutting insert; side surfaces formed at four sides of each of the upper surface and the lower surface; an assembling hole formed in a direction perpendicular to the upper surface; major cutting edges formed at corners of one of the side surfaces respectively so as to be rotationally symmetrical with respect to a center of an outer shape of the double-sided cutting insert in a plan view where the upper surface is the front and to be rotationally symmetrical with respect to the center in a front view where the one of the side surfaces is the front; minor cutting edges formed at one side of each of the major cutting edges so as to be rotationally symmetrical with respect to the center in a plan view where the upper surface is the front and to be rotationally symmetrical with respect to the center in a front view where the one of the side surfaces is the front; and minor side surfaces formed on a surface where the minor cutting edges meet the side surfaces and inclined toward the center with respect to a central axis of the assembling hole.

The double-sided cutting insert may further include first to fourth flat side surfaces formed on some portions of the minor side surfaces and being parallel to the central axis with respect to the central axis of the assembling hole.

The double-sided cutting insert may further include chip breakers formed in the major cutting edges respectively, and wave grooves formed in the chip breakers respectively so as to have a zigzagged shape.

The details of the other embodiments will be contained in Mode for the Invention and the drawings.

Advantageous Effects

Since the cutting insert of the present invention has marginal surfaces on a minor side surface of all minor cutting edges, a suitable marginal angle and a suitable inclination angle can be secured in any minor cutting edge even if the cutting insert is used in an inverted state or a rotated state, making it possible to extend a life span of the cutting insert and improve cutting performance.

BRIEF DESCRIPTION OF THE DRAWINGS

The above and other objects, features and advantages of the present invention will become more apparent from the following detailed description taken in conjunction with the accompanying drawings, in which.

Figure 1:
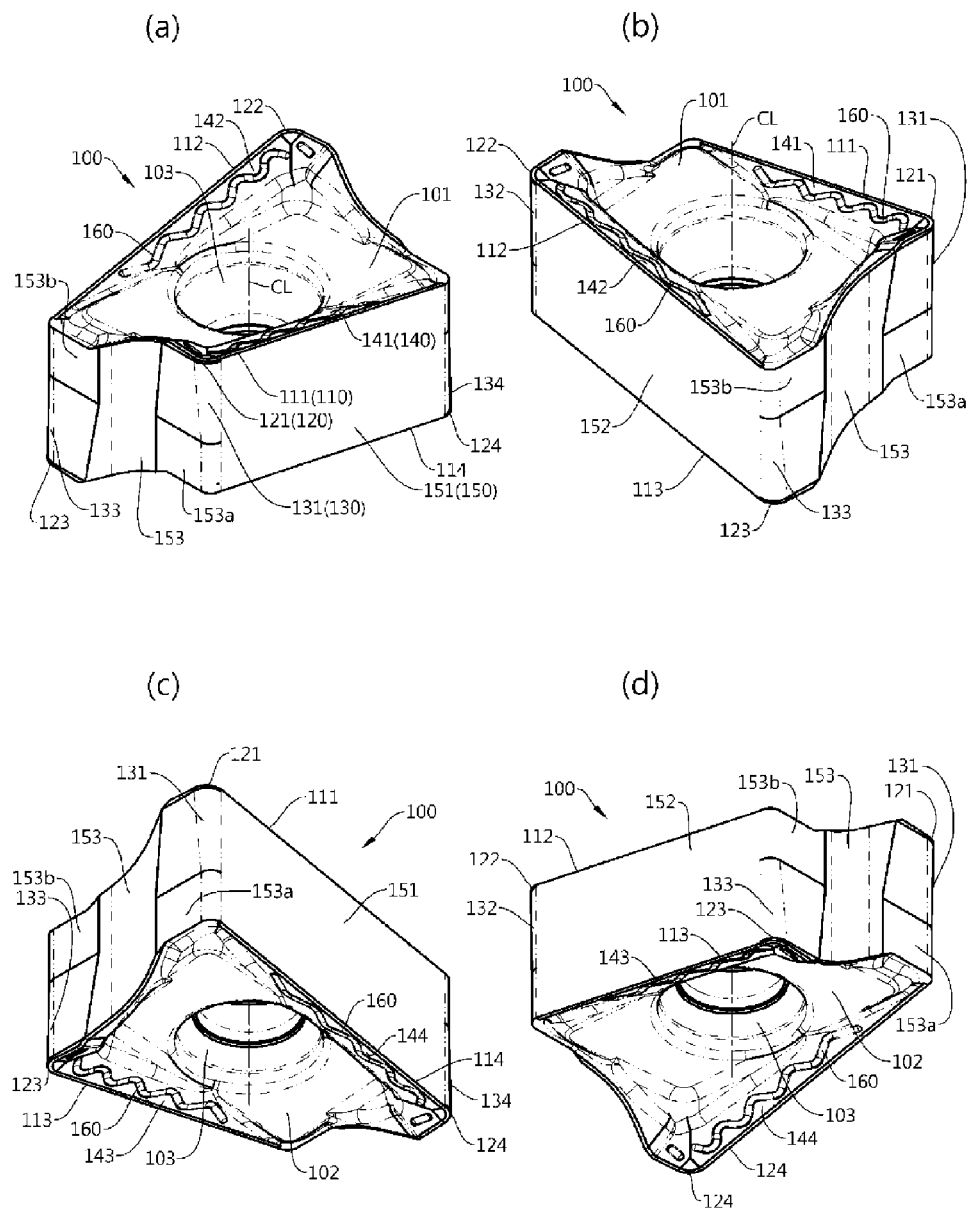
FIG. 1 illustrates perspective views illustrating a cutting insert according to an embodiment of the present invention.

| * Description of Reference Numerals * | |
|---|---|
| 100: Cutting insert | |
| 101: Upper surface | 102: Lower surface |
| 103: Assembling hole | |
| 110: Major cutting edge | 120: Minor cutting edge |
| 130: Minor side surface | 140: Chip breaker |
| 150: Side surface | 160: Wave groove |
| 111 to 114: First to fourth major cutting edges | |
| 121 to 124: First to fourth minor cutting edges | |
| 131 to 134: First to fourth minor side surfaces | |
| 141 to 144: First to fourth chip breakers | |
| 151 to 154: First to fourth side surfaces | |

MODE FOR INVENTION

The advantages and features of the present invention, and a method of achieving them will be apparent with reference to an exemplary embodiment of the present invention which is described in detail in conjunction with the accompanying drawings.

The same or like reference numerals indicate the same or like elements throughout the specification.

Hereinafter, a cutting insert 100 according to an embodiment of the present invention will be described with reference to FIGS. 1 to 4.

Figure 2:
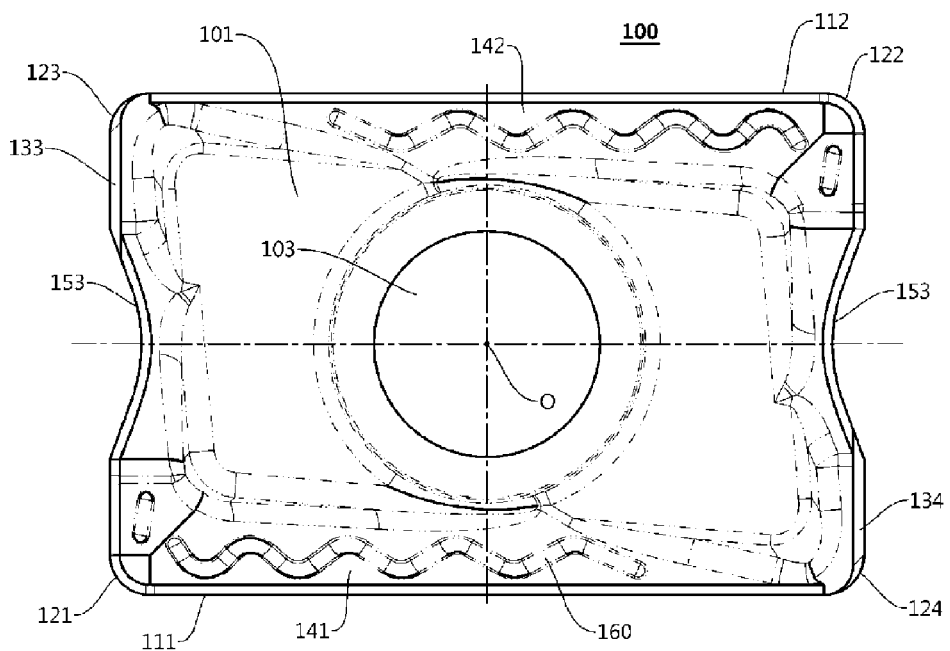
FIGS. 2 to 4 are a plan view, a front view, and a side view illustrating the cutting insert according to the embodiment of the present invention.
Figure 3:
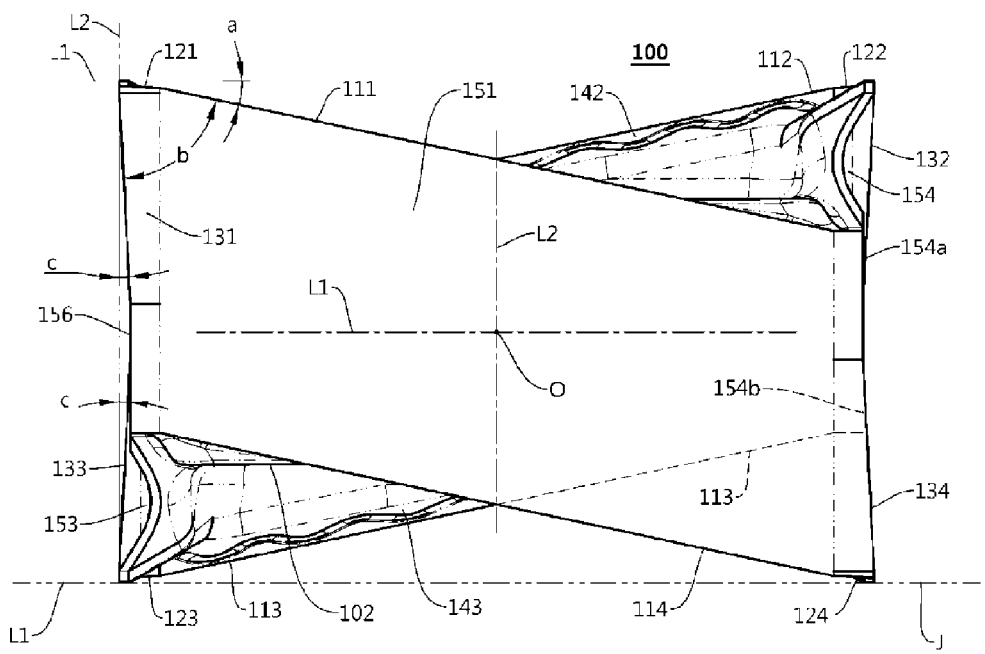
Figure 4:
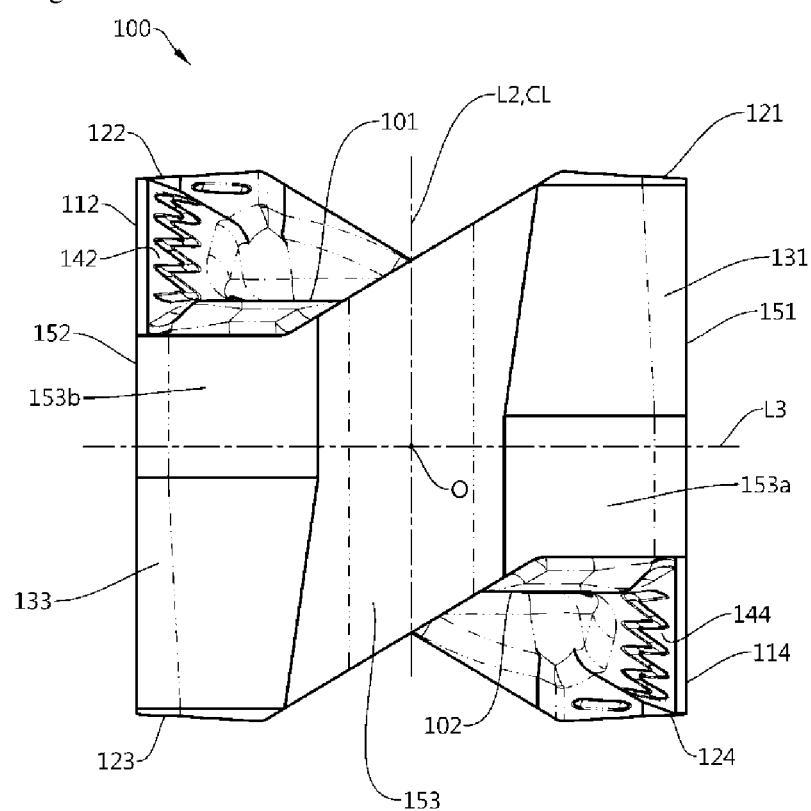

FIG. 1 illustrates perspective views illustrating the cutting insert according to the embodiment of the present invention. FIGS. 2 to 4 are a plan view, a front view, and a side view illustrating the cutting insert according to the embodiment of the present invention.

As illustrated in FIGS. 1 to 4, the cutting insert 100 according to the embodiment of the present invention corresponds to a rectangular solid having an upper surface 101 and a lower surface 102 spaced vertically, and side surfaces 150 at four sides of each of the upper surface 101 and the lower surface 102, where in an assembling hole 103 is formed in a direction perpendicular to the upper surface 101 and the lower surface 102.

The upper surface 101 and the lower surface 102 are formed to be rotationally symmetrical when viewed from the top, viewed from the front, and viewed from the sides, with reference to the center O of the outer shape of the cutting insert 100.

In more detail, the upper surface 101 has a rectangular shape in a plan view where the upper surface 101 is a front surface, wherein major cutting edges 110 are formed at edges on the right and left sides of the upper surface 101, minor cutting edges 120 are formed at corners of the major cutting edges 110, and minor side surfaces 130 are formed on side surfaces of the minor cutting edges 120.

The major cutting edges 110 are formed with an inclination such that one end thereof is higher than the upper surface 101 and another end thereof is lower than the upper surface 101, and major cutting edges 100 are also formed to be rotationally symmetrical in the lower surface 102.

The major cutting edges 110 include a total of four major cutting edges, i.e. first to fourth major cutting edges 111 to 114, two major cutting edges being formed at upper and lower sides respectively.

The minor cutting edges 120 include first to fourth minor cutting edges 121 to 124 at sides of the first to fourth major cutting edges 111 to 114.

The side surfaces 150 on the four side surfaces include first and second side surfaces 151 and 152 formed at sides where the major cutting edges 110 are formed at upper and lower sides thereof, and third and fourth side surfaces 153 and 154 formed at sides where the minor cutting edges 120 are formed at upper and lower sides thereof.

The third and fourth side surfaces 153 and 154 are concave at middle portions thereof and are flat at right and left sides thereof, wherein first and second flat side surfaces 153a and 153b are formed on the third side surface 153 and third and fourth flat side surfaces 154a and 154b are formed on the fourth side surface 154.

The minor side surfaces 130 form an acute angle with an imaginary horizontal line when viewed from a side view where the first side surface 151 is a front surface.

In more detail, the minor side surfaces 130 include first to fourth minor side surfaces 131 to 134 formed in the first to fourth minor cutting edges 121 to 124. As illustrated in the side view of FIG. 3, the first minor side surface 131 on the upper side and the third minor side surface 133 are inclined toward the center O with respect to an imaginary horizontal reference line L1 and the second minor side surface 132 on the counter upper side and the fourth minor side surface 134 on the counter lower side are also inclined toward the center O, forming a mortar-like shape whose middle portion is slender in its entirety.

That is, the cutting insert 100 according to the embodiment of the present invention realizes a positive type where the first minor side surface 131 on the upper side and the third minor side surface 133 on the lower side, and the second minor side surface 132 on the upper side and the fourth minor side surface 134 on the lower side are not parallel to each other, respectively.

Meanwhile, since the first to fourth minor side surfaces 131 to 134 are inclined in a positive type, it is necessary to manage the outer size of the cutting insert 100 when the quality of the cutting insert 100 is tested, in which case first to fourth flat side surfaces 153a, 153b, 154a, and 154b, which are portions of the first to fourth minor side surfaces 131 to 134, are formed to be parallel to the imaginary vertical reference line L2.

Meanwhile, chip breakers 140 are formed in the major cutting edges 110. In more detail, first to fourth chip breakers 141 to 144 are formed to be inclined at acute angles on upper and side surfaces connected to the major cutting edges 111 to 114.

Concave wave grooves 160 are formed on surfaces of the chip breakers 140. The wave grooves 160 are zigzagged in the form of a wave, and as illustrated in FIG. 2, the pitch of the zigzagged shape is shorter on a side close to the center O than on a side far away from the center O.

Hereinafter, an operation of the cutting insert according to the embodiment of the present invention will be described with reference to FIGS. 5 to 8.

Figure 5:
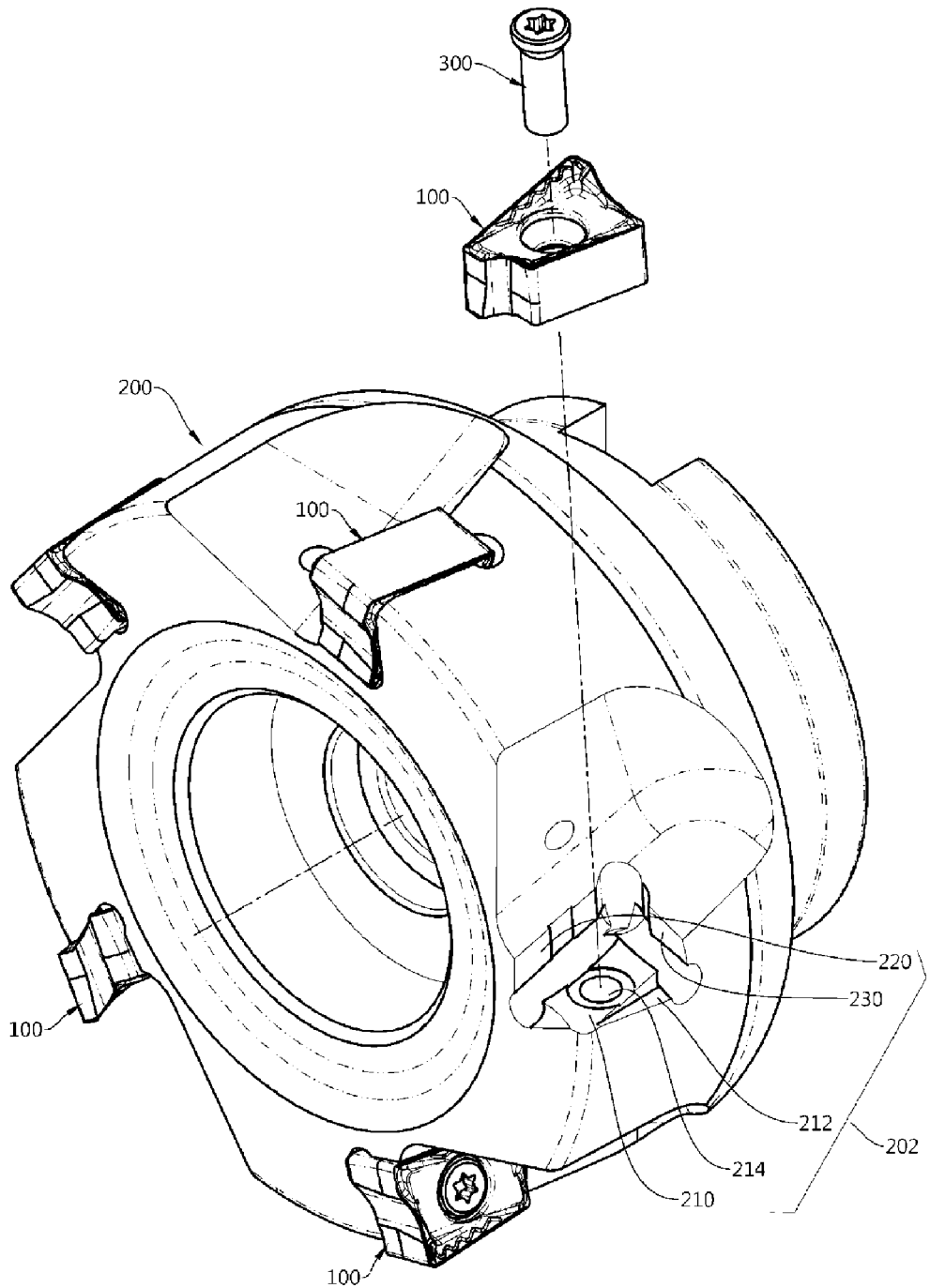
FIGS. 5 and 6 are a perspective view and a front view illustrating an example of installing the cutting insert according to the embodiment of the present invention in a cutting tool.
Figure 6:
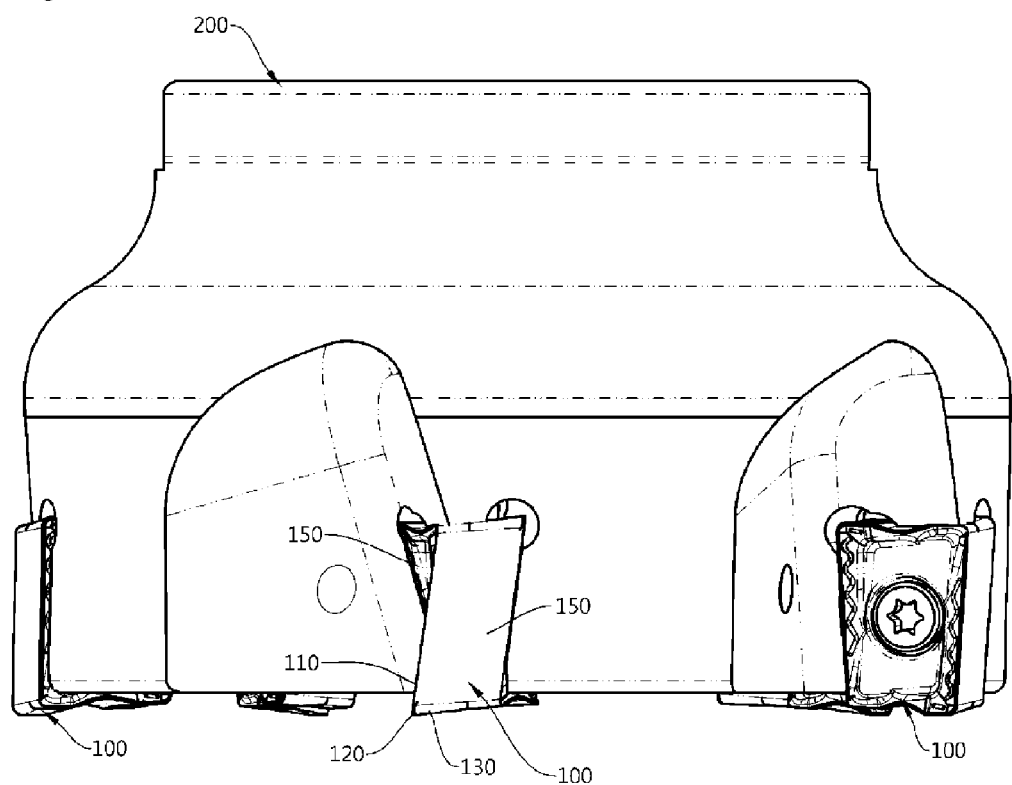
Figure 7:
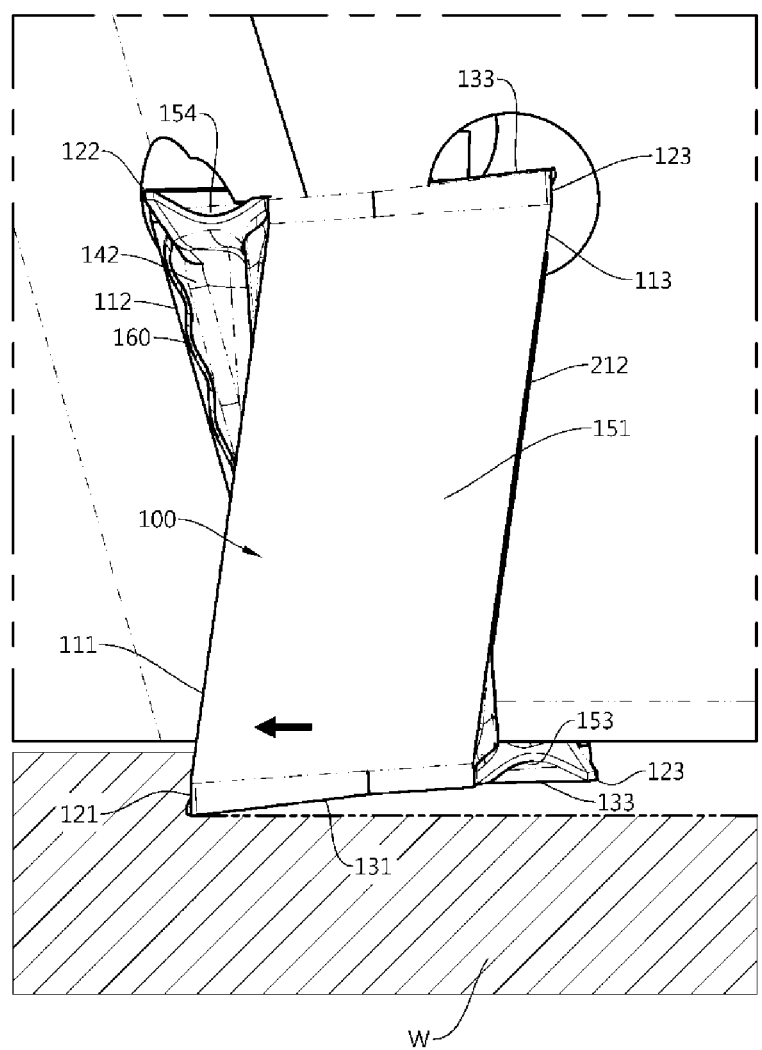
FIG. 7 is a sectional view for explaining an operation of the cutting insert according to the embodiment of the present invention.
Figure 8:
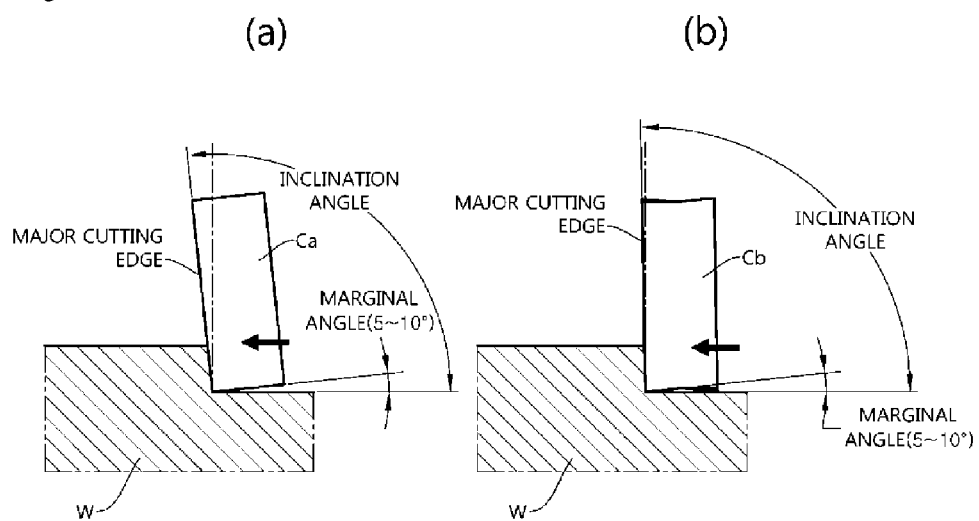
FIG. 8 illustrates exemplary views for explaining marginal angles and inclination angles of the cutting insert according to positions of the cutting insert.

FIGS. 5 and 6 are a perspective view and a front view illustrating an example of installing the cutting insert according to the embodiment of the present invention in a cutting tool. FIG. 7 is a sectional view for explaining an operation of the cutting insert according to the embodiment of the present invention. FIG. 8 illustrates exemplary views for explaining marginal angles and inclination angles of the cutting insert according to positions of the cutting insert.

As illustrated in FIGS. 5 and 6, a pocket 202 is formed in the cutting tool 200, and the cutting insert 100 is coupled and fixed to the pocket 202 using a coupling screw 300.

The pocket 202 has first, second, and third seats 210, 220, and 230, and a female screw 214 is formed in the first seat 210.

A marginal jaw 212 is formed at one side of the first seat 210. The marginal jaw 212 accommodates a portion of the major cutting edges 110 to prevent interference with the cutting insert 100 when the cutting insert 100 is coupled, making it possible to stably couple the cutting insert 100.

That is, the upper surface 101 or the lower surface 102 of the cutting insert 100 contacts the first seat 210, the first side surface 151 or the second side surface 154 contacts the second seat 220, and the third side surface 153 or the fourth side surface 154 contacts the third seat 230.

As illustrated in FIG. 7, in a state where the cutting insert 100 is installed in the cutting tool 200, the first major cutting edge 111 forms an acute angle with a surface of a work piece and the first minor side surface 131 forms a predetermined angle with a cut surface of the work piece W.

That is, the work piece is cut as the cutting insert 100 progresses, in which case the major cutting edges 110 realizes an excellent inclination angle with the work piece W, improving cutting performance, and the minor side surfaces minimize frictions with the work piece W, reducing generated frictional heat, whereby the life span of the cutting insert 100 is prevented from being shortened due to the generated heat, resulting in an extension of the life span of the cutting insert 100.

The inclination angle and the marginal angle will be additionally described with reference to FIG. 8.

FIG. 8A illustrates an example where an inclination angle between a major cutting edge of a cutting insert Ca and a surface of a work piece W form an obtuse angle, i.e. a negative type.

FIG. 8B illustrates an example where an inclination angle between a major cutting edge of a cutting insert Cb and a surface of a work piece W form a right or acute angle, i.e. a positive type.

The negative type cutting insert has a low cutting performance because a large cutting resistance is applied to the cutting insert while the cutting progresses, whereas the positive type cutting insert has an excellent cutting performance because a relatively small cutting resistance is applied to the cutting insert as compared with the negative type cutting insert.

A strength of a cutting insert is lowered if a marginal angle is too large whereas much heat is generated if a marginal angle is too small, so repeated experiments show that an optimum marginal angle may be determined with reference to FIGS. 5 to 10.

Meanwhile, a marginal angle may be determined according to a position of the cutting insert 100 when the cutting insert 200 is installed in the cutting tool 200, in which case a marginal angle in both the negative cutting insert and the positive cutting insert may be determined according to the shape of the pocket 202 of the cutting tool 200.

In the mean time, a positive type cutting insert Cb is more advantageous than a negative type cutting insert Ca in terms of inclination angle, whereas it is not easy to form major cutting edges and minor cutting edges in a cutting insert using double sides in spite of the fact that it is easy to form major cutting edges and minor cutting edges in a positive type cutting insert using a single side.

Meanwhile, as illustrated in FIG. 3, in the cutting insert 100 according to the embodiment of the present invention, the first minor side surface 131 on the upper side and the third minor side surface 133 on the lower side, and the second minor side surface 132 on the upper side and the fourth minor side surface 134 on the lower side are not parallel to each other respectively, achieving positive types respectively, in which case even if the cutting insert 100 is used in an inverted state, the major cutting edges 110 and the minor cutting edges 120 performing a cutting operation realize positive types, improving cutting performance.

In addition, there is a need to manage an outer size when the quality of the cutting insert 100 is tested, in which case the size of an outer size may be measured and managed with reference to the first to fourth flat side surfaces 153a, 153b, 154a, and 154b.

Hereinafter, an operation and an effect of the cutting insert according to the embodiment of the present invention will be described with reference to FIGS. 9 and 10.

Figure 9:
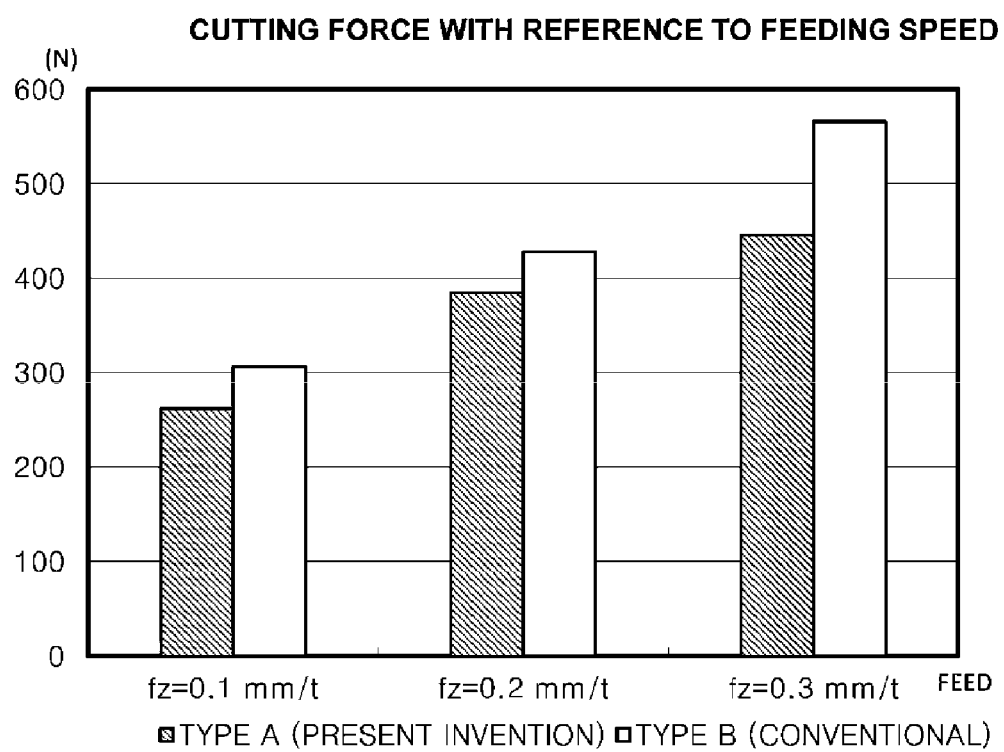
FIGS. 9 and 10 are graphs for comparing cutting performances and life spans of the cutting insert according to the embodiment of the present invention.
Figure 10:
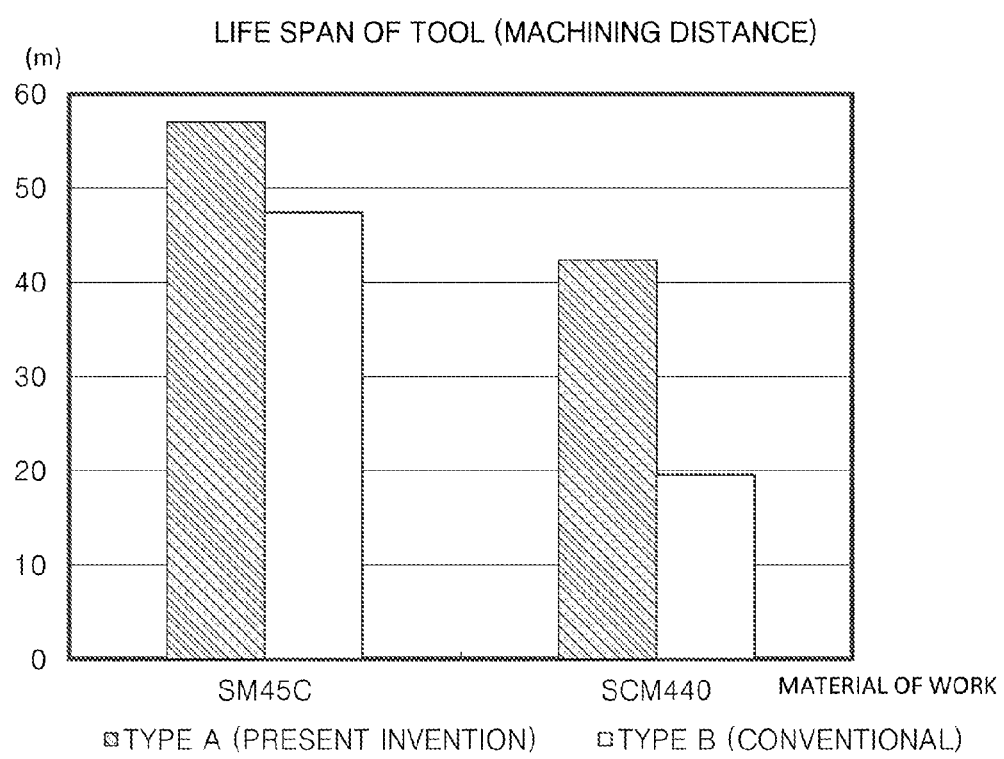

FIGS. 9 and 10 are graphs for comparing cutting performances and life spans of the cutting insert according to the embodiment of the present invention.

FIG. 9 illustrates a test result for cutting forces, wherein feeding speeds (mm/t) were set to 0.1 mm/t, 0.2 mm/t, and 0.3 mm/t for the cutting insert (Type A) according to the embodiment of the present invention and a conventional cutting insert (Type B) in the test conditions and forces (N) of cutting resistances were measured in each situation.

The forces (N) of the cutting resistances measured in the cutting insert (Type A) according to the embodiment of the present invention were measured to be 262 N, 385 N, and 446 N respectively, and the forces (N) of the cutting resistances measured in the conventional cutting insert were measured to be 306 N, 428 N, and 566 N respectively.

That is, it can be seen that cutting resistance is significantly reduced by applying the technology of the cutting insert 100 according to the embodiment of the present invention, and accordingly a fast cutting operation may be realized.

FIG. 10 illustrates a test result for tool life spans (machining distances), wherein a carbon steel (SM45C) for machine structural use and an alloy steel (SCM440) for machine structural use are prepared for specimens and machined by the cutting insert (Type A) according to the embodiment of the present invention and a conventional cutting insert (Type B) to measure machining distances.

The machining distances of the cutting insert (Type A) according to the embodiment of the present invention were 57 M and 42.4 M respectively, and the machining distances of the conventional cutting insert (Type B) were 47.4 M and 19.6 M respectively.

That is, it can be seen that the cutting insert (Type A) to which the technology of the cutting insert 100 according to the embodiment of the present invention is applied has a life span longer than that of the conventional cutting insert (Type B).

Accordingly, since the major cutting edges and the minor cutting edges of the cutting insert 100 according to the embodiment of the present invention are formed in a positive type, the cutting performance of the cutting insert 100 is excellent while the cutting insert 100 uses double sides. Further, since little heat is generated in the cutting insert 100, the life span of the tool can be lengthened.

Although an embodiment of the present invention has been described with reference to the accompanying drawings, it should be understood that those skilled in the art can carry out other modifications without changing its technical spirit or essential features.

Therefore, the above-described embodiment of the present invention is merely exemplary in all aspects and should not be construed to be limited, and it should be understood that the scope of the present invention is defined by the following claims and the meanings and ranges of the claims and all modifications and changed forms derived from their equivalents pertain to the scope of the present invention.

INDUSTRIAL APPLICABILITY

The cutting insert according to the present invention can be used to carry out a cutting operation.

The invention claimed is:

1. A double-sided cutting insert comprising:
an upper surface and a lower surface each having a rectangular shape and formed at upper and lower sides of the double-sided cutting insert;
side surfaces formed at four sides of each of the upper surface and the lower surface;
an assembling hole formed in a direction perpendicular to the upper surface;
major cutting edges formed at corners of one of the side surfaces respectively so as to be rotationally symmetrical with respect to a center of an outer shape of the double-sided cutting insert in a plan view where the upper surface is the front and to be rotationally symmetrical with respect to the center in a view of one of the side surfaces, which is a side view of the double-sided cutting insert;
minor cutting edges formed at one side of each of the major cutting edges so as to be rotationally symmetrical with respect to the center in a plan view where the upper surface is the front and to be rotationally symmetrical with respect to the center in a view of one of the side surfaces, which is a side view of the double-sided cutting insert; and
minor side surfaces formed on a surface where the minor cutting edges meet the side surfaces and inclined toward the center with respect to a central axis of the assembling hole.

2. The double-sided cutting insert as claimed in claim 1, further comprising:
first to fourth flat side surfaces formed on some portions of the minor side surfaces and being parallel to the central axis with respect to the central axis of the assembling hole.

3. The double-sided cutting insert as claimed in claim 1, further comprising:
chip breakers formed in the major cutting edges respectively; and
wave grooves formed in the chip breakers respectively so as to have a zigzagged shape.

* * * * *